(12) United States Patent
Paurd (10) Patent No.: US 11,447,279 B2
(45) Date of Patent: Sep. 20, 2022

(54) DEVICE FOR DEPOSITING A PRECISE QUANTITY OF PRODUCT

(71) Applicant: NBREAD-PROCESS, Contres (FR)

(72) Inventor: Olivier Paurd, Blois (FR)

(73) Assignee: NBREAD-PROCESS, Contres (FR)

( * ) Notice: Subject to any disclaimer, the term of this patent is extended or adjusted under 35 U.S.C. 154(b) by 913 days.

(21) Appl. No.: 16/319,762

(22) PCT Filed: Jul. 17, 2017

(86) PCT No.: PCT/FR2017/051946
§ 371 (c)(1),
(2) Date: Jan. 22, 2019

(87) PCT Pub. No.: WO2018/015648
PCT Pub. Date: Jan. 25, 2018

(65) Prior Publication Data
US 2021/0285806 A1    Sep. 16, 2021

(30) Foreign Application Priority Data

Jul. 22, 2016 (FR) ...................................... 16 57038

(51) Int. Cl.
*A21C 5/00* (2006.01)
*B65B 3/32* (2006.01)
(Continued)

(52) U.S. Cl.
CPC ................ *B65B 3/32* (2013.01); *A21C 5/006* (2013.01); *B65B 3/12* (2013.01); *B65B 37/20* (2013.01);
(Continued)

(58) Field of Classification Search
CPC .. B65B 3/12; B65B 3/32; B65B 37/20; A21C 5/006; G01F 11/021; G01F 11/029; G01F 11/16
See application file for complete search history.

(56) References Cited

U.S. PATENT DOCUMENTS

| 1,062,576 A * | 5/1913 | Baskett et al. ....... A47K 5/1207 |
| | | 222/453 |
| 3,685,554 A * | 8/1972 | Encke ...................... B65B 3/32 |
| | | 417/399 |

(Continued)

FOREIGN PATENT DOCUMENTS

| EP | 1 155 748 A1 | 11/2001 |
| FR | 2 394 468 A1 | 1/1979 |

(Continued)

OTHER PUBLICATIONS

International Search Report, dated Oct. 19, 2017, from corresponding PCT/FR2017/051946 application.

*Primary Examiner* — Nicolas A Arnett
(74) *Attorney, Agent, or Firm* — Nixon & Vanderhye (57) ABSTRACT

A distribution assembly for product delivers and deposits a precise quantity of product on a support. The assembly includes a cylinder, a piston, displaced in the cylinder by an actuator, a route for taking in the product, an ejection head with a slide valve movable between a first closed position and a second open position, and an outlet nozzle, a preparation chamber, a transfer passage, connecting, selectively the preparation chamber with the outlet nozzle. When the cylinder comes towards the support, the physical contact with the support moves the slide valve from the first position to the second position and triggers delivery of the product, pushed by the piston, via the transfer passage. When the piston arrives at the forward end of range, the piston moves (Continued)

the slide valve from the second to the first position, closing the passage for the product via the transfer passage.

10 Claims, 8 Drawing Sheets

(51) Int. Cl.
    *B65B 37/20*     (2006.01)
    *G01F 11/02*     (2006.01)
    *G01F 11/16*     (2006.01)
    *B65B 3/12*     (2006.01)

(52) U.S. Cl.
    CPC .......... *G01F 11/021* (2013.01); *G01F 11/029* (2013.01); *G01F 11/16* (2013.01)

(56) References Cited

U.S. PATENT DOCUMENTS

| | | | |
|---|---|---|---|
| 3,715,061 A * | 2/1973 | Morine | F04B 23/023 |
| | | | 222/334 |
| 4,210,263 A | 7/1980 | Bos | |
| 6,715,506 B1 * | 4/2004 | Ikushima | G01F 11/021 |
| | | | 141/26 |
| 7,621,427 B2 | 11/2009 | Monti | |
| 8,783,524 B2 * | 7/2014 | Lagares Corominas | |
| | | | G01F 11/021 |
| | | | 222/387 |
| 2004/0251279 A1 | 12/2004 | Heitlinger | |
| 2005/0072815 A1 * | 4/2005 | Carew | F04B 7/0225 |
| | | | 222/504 |
| 2006/0289082 A1 | 12/2006 | Thomsen | |
| 2010/0072229 A1 | 3/2010 | Veltrop et al. | |
| 2018/0154379 A1 * | 6/2018 | Knight | B05B 11/3052 |
| 2018/0155071 A1 * | 6/2018 | Macquet | G01F 11/16 |
| 2020/0018629 A1 * | 1/2020 | Shea-Simonds | G01F 11/125 |

FOREIGN PATENT DOCUMENTS

| | | |
|---|---|---|
| GB | 2 198 707 A | 6/1988 |
| WO | 90/08075 A1 | 7/1990 |

* cited by examiner

DEVICE FOR DEPOSITING A PRECISE QUANTITY OF PRODUCT

FIELD AND CONTEXT OF THE INVENTION

The present invention relates to devices for distribution of product in liquid or dough or even effervescent form, in particular for delivering and depositing the precise quantity of product in a mold or receptacle or on a support.

In particular, the present invention applies to the field of food products and food preparations.

Systems are known with which to deposit liquid food products from a pressurized reservoir because of opening a controlled valve for a predetermined time. However, it turns out that the volume of the quantity of matter which passes during the set time is not really controlled. Further, such a method leads to splatters and does so even more as the pressure increases.

Further, the set time must necessarily be adapted to the viscosity of the food product and/or the temperature of the food product.

Devices are also known, for example from documents U.S. Pat. No. 7,621,427 or US 2006/289082, with an intermediate chamber filled by the movement of a piston in a first step and emptied by another movement of the piston in a second step. In these solutions, a translational movement and a rotational movement of the piston must both be provided. Further, the dead space present in the intermediate chamber and in the outlet conduit is substantial considering the shape of the piston which is unfavorable to the full control of the quantity delivered.

Consequently, a need remains for proposing a solution for depositing a controlled quantity of potentially heterogeneous food product at low pressure, in particular a solution which is suitable whatever the viscosity of the product, the homogeneity or inhomogeneity thereof, and potentially effervescent properties thereof, whatever the particle size of the product, which could be variable.

BRIEF DESCRIPTION OF THE INVENTION

For this purpose, a distribution assembly is proposed here for product in liquid or dough or foam form, for delivering and depositing a precise quantity of product on a support, where the device comprises:
  a cylinder (1), having an axis A;
  a piston (2), which can be displaced in the cylinder by at least one actuator;
  a path for taking in the product;
  an ejection head, which comprises a slide valve movable between a first position (P1) called closed and a second position (P2) called open, and an outlet nozzle;
  a preparation chamber (5) arranged in the cylinder between the piston and the ejection head; and
  at least one transfer passage, connecting, selectively according to the position of the slide valve, the preparation chamber with the outlet nozzle;
where the distribution assembly is arranged such that when the cylinder comes towards the support, the physical contact with the support moves the slide valve from the first position to the second position and triggers delivery of the product, pushed by the piston, via the transfer passage, and when the piston arrives at the forward end of range, the piston moves the slide valve from the second position to the first position and thus closes the passage for the product via the transfer passage, and where the first and second positions are stable.

Thanks to these arrangements, the slide valve forms a bistable slide valve with two positions, open and closed, with the change of status caused by a purely mechanical action, meaning contact with the support for opening and the arrival at the end of range of the piston for closing.

Further, advantageously, the preparation chamber precisely defines the volume to be delivered; the transfer passage represents a very small volume; consequently when the piston advances to the maximum, the product dead space in the transfer passage is both small and also constant cycle after cycle.

In various embodiments of the invention, one and/or another of the following provisions could further be used:

According to an interesting specific case, the product used in the distribution assembly is a food product. The system presented, and also the corresponding method, turns out to form a particularly interesting solution for repetitively depositing on a production line a controlled quantity of food product, for example in advance of going through a cooking oven.

According to a specific solution, the product can enter the preparation chamber, via a controlled valve arranged on the intake path, from a pressurized reservoir; by means of which the filling of the preparation chamber can be very fast, even extremely fast, in this way the most of the cycle time is used for depositing at low-pressure and very little time is used for re-filling before the following deposit.

According to a specific solution, the product can be taken into the preparation chamber from a reservoir by using gravity; in this configuration, the system used is particularly simple, with storage in a hopper for the product reserve/supply.

According to a particular solution, the piston may comprise an axial intake channel (20) for taking in the product. In a preferred solution, the axial intake channel comprises a central bore and at least one extension on a bias, and preferably three extensions on a bias distributed around the axis. In this way, the cylinder is particularly simple to manufacture, and because of the extensions on a bias which open out away from the axis, the shape of the piston is ideal for pushing back the slide valve in the central axial part.

According to an alternative solution, it is anticipated that the intake channel can be radial, through an orifice laid out in the cylinder in the neighborhood of the ejection head (more precisely in the neighborhood of the surface delimiting the preparation chamber); in that version, the piston is simpler to manufacture and a single actuator can be arranged for coaxially maneuvering the piston therebehind.

According to an implementation, the slide valve can comprise a cylindrical body, a cylindrical rear rod of smaller section than the section of this cylindrical body, and a front rod, cylindrical or not, and of smaller section than the section of the cylindrical body. A bistable effect can result from the ratio of the sections, meaning that since the section of the rear rod is smaller, the pressure exerted by the piston, when it approaches, remains moderate and below the sum of the pressure exerted upstream and the friction of the O-rings. Further, the thinness of the front rod makes it possible to have a sufficiently large outlet nozzle opening around this rod.

According to an implementation, at least one O-ring is provided around the rear rod and at least one O-ring around the cylindrical body. With these rings, a leak from the preparation chamber (5) towards the release chamber (94) can be avoided as can a rise of product from the outlet nozzle towards the release chamber; additionally, the presence of these O-rings is advantageous for guaranteeing the stability of the two end positions of the slide valve, specifically the open position and the closed position, because of friction from the O-rings opposing displacement thereof.

According to an implementation, the piston is mounted on a frame with the (one or more) actuators, and the jacket and the ejection head are what moves relative to the piston and the frame. Under these conditions, it is sufficient to drive the position of the cylinder, whereas the piston associated with the maneuvering actuator remain stationary; that turns out to be a very simple and low-cost configuration.

According to an implementation, guiding columns and a flange secured to the cylinder are provided; the guiding columns are mounted on the flange. Under these conditions, the actuator and the maneuvering actuators can be a relatively simple type without guiding function. Alternatively, it can be provided that the rods for the actuators provide the guiding function like the columns.

According to an embodiment, the guiding columns and the piston rods 73, 74, four or more, are distributed on an annular zone of the flange. A compact and very well-balanced assembly is thus proposed.

According to an implementation, the system comprises a device for adjustment of the volume dispensed, where the maximum separation between the piston and the jacket, specifically the volume taken into the preparation chamber, can be controlled with the adjustment device. In that way, it is very easy to reconfigure the distribution assembly for changing a production campaign.

According to an implementation, the system advantageously comprises a release chamber, configured to receive the cylindrical body of the slide valve when it goes back up to the open position P2, and a passage for connecting this release chamber to open air. In that way, the movement of the slide valve is in no way hindered by the hollow space that it delimits inside the ejection head and by the air that cyclically fills it.

According to an implementation, the transfer passage may comprise a bore with an axis parallel to the axis A of the cylinder and an oblique ("on a bias") hole. In that way, one or more passages for transfer in an annular zone of the ejection head and exterior zone of the slide valve can be obtained by conventional machining. Advantageously, two or three transfer passages distributed uniformly around the axis A can be provided. A section for passage that is sufficient for the product flow can be obtained without bottleneck effect.

According to an implementation, the support is formed by one or more receptacle(s) or mold(s).

According to an implementation, the support can be driven during delivery of the product by a relative movement compared to the cylinder.

DESCRIPTION OF THE FIGURES

Other aspects, goals and advantages of the invention will appear upon reading the following description of several embodiments thereof, given as nonlimiting examples. The invention will be better understood in light of the attached drawings on which.

It should be noted that to improve the readability and clarity of the disclosure, not all the numeric references are shown on FIGS. 2 to 4, but it must be understood that the numerical references indicated on FIG. 1 can be referred to concerning FIGS. 2 to 4.

DETAILED DESCRIPTION

In the various figures, the same references designate identical or similar items. In an embodiment of the present invention, a precise and controlled quantity of a food product is to be deposited.

However, the configuration of the system presented below can also be suited for delivering a controlled quantity of any kind of product, whether it is a chemical product, adhesive, additive, catalyst and more generally any nonfood product.

The product to be dispensed can come in the form of a dough, liquid, powder, or foam. Further, the product is not necessarily homogeneous: it can include granules, chips and more generally inserts of a size larger than the general particle size of the product. The product can be foamy and/or effervescent.

According to an advantageous solution for mass production, an operation of loading a controlled quantity of product and delivering this quantity of product onto the support is to be repeated without delay. Generally, the support can be fixed or mobile relative to the distribution system, which is now going to be described.

The distribution system can be located on a fixed frame, or on a small gantry with several degrees of freedom, or even at the end of a robot arm.

According to an example shown in FIGS. 1 to 8, the product is deposited by a distribution assembly 10 (also called distribution system 10 without distinction) which will be detailed later. The product is deposited on the support 9 which moves, preferably horizontally, relative to the distribution device. The support in question can be a conveyor or conveyor belt type. The product is placed either directly on the conveyor, or on small containers or molds placed on the conveyor and moving with the container. Of course the support 9 can also be stationary.

A movement of the distribution assembly can also be provided in particular in the case where it is carried at the end of a robot arm.

Figure 1:
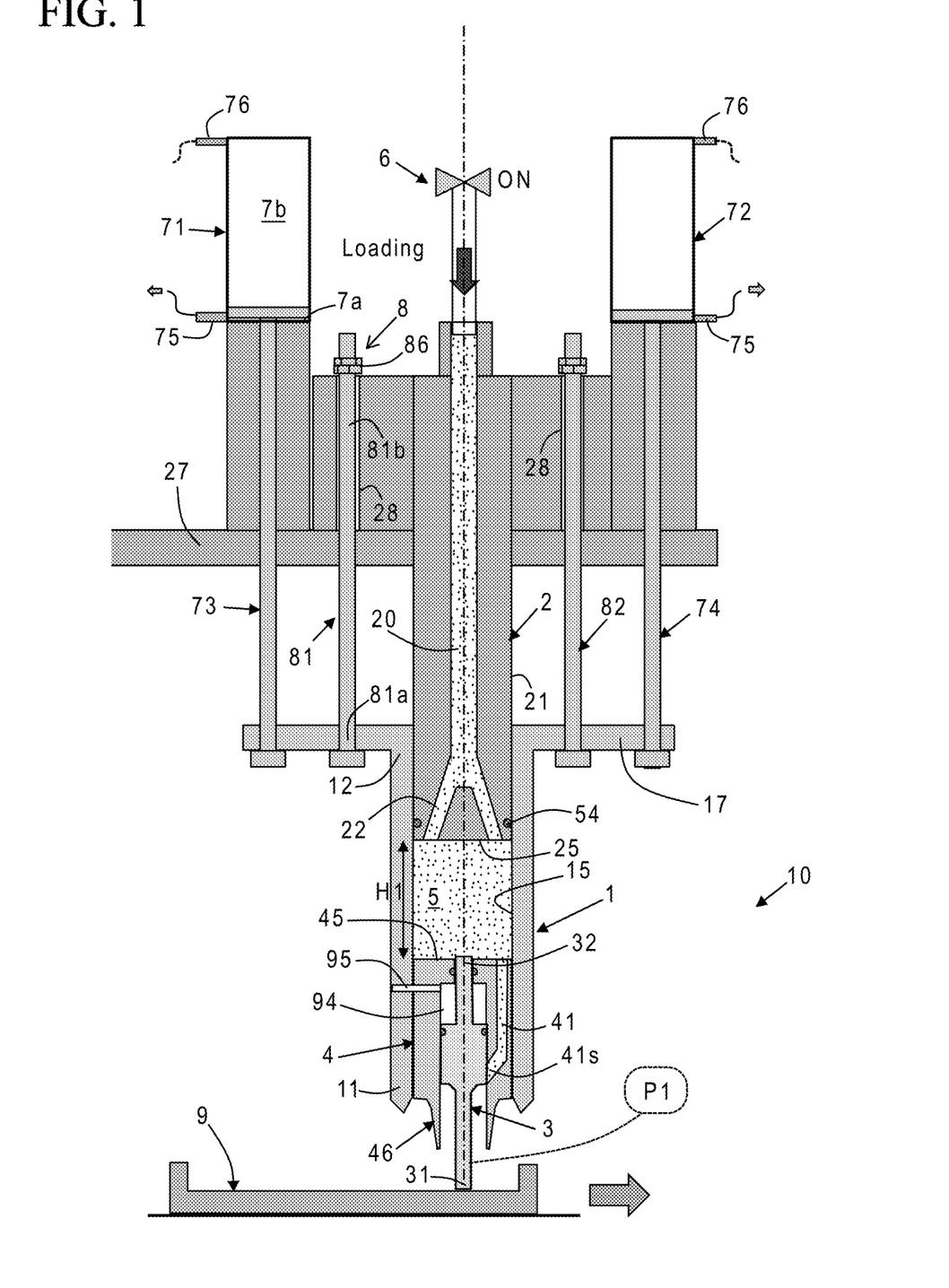
FIG. 1 is a schematic view in section of a distribution system/assembly according to a first embodiment of the invention, in a configuration after product intake and just before delivery.
Figure 2:
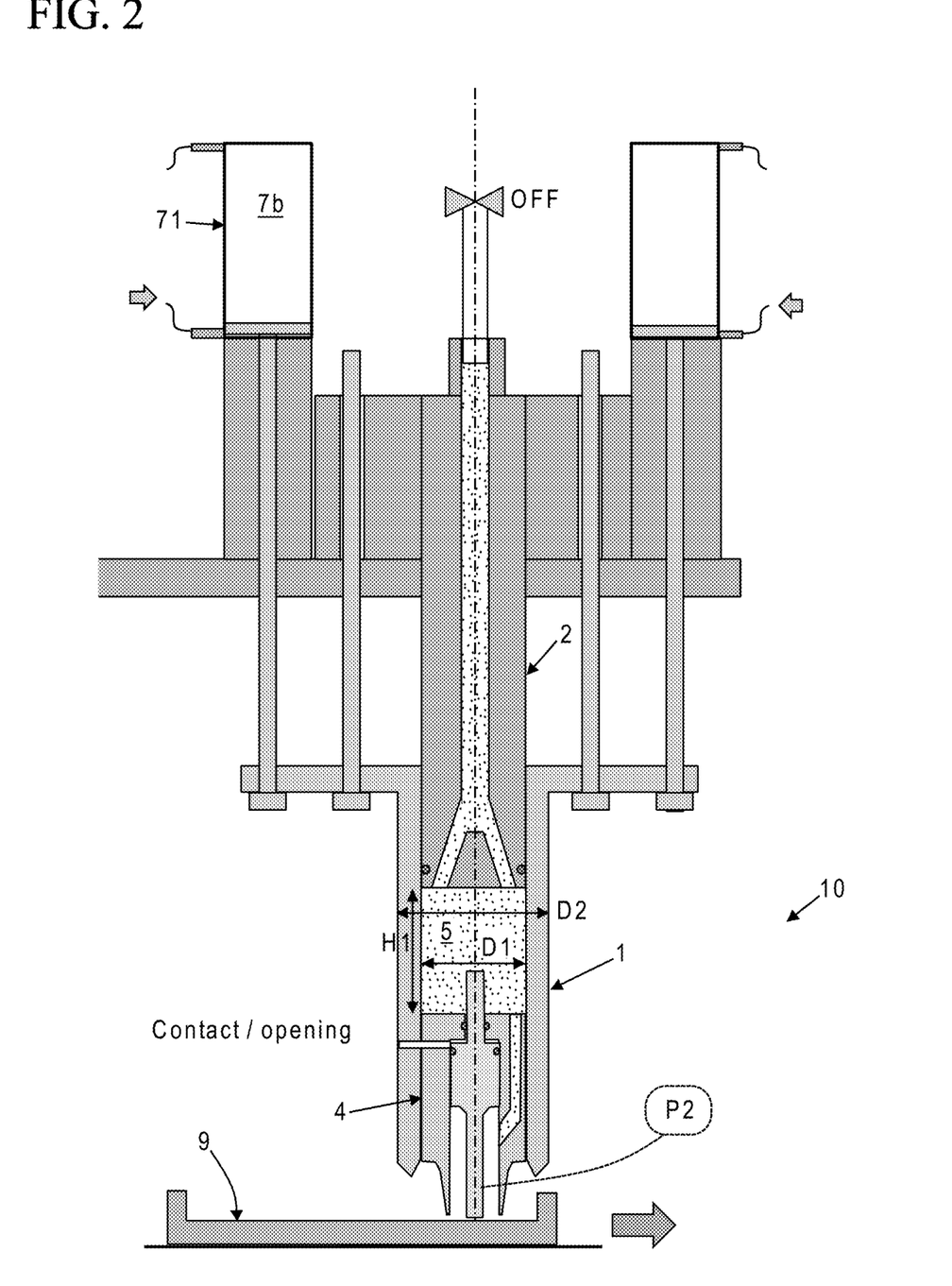
FIG. 2 is a view analogous to FIG. 1 in a configuration just after opening of the slide valve caused by contact with the support.

The distribution assembly 10 comprises a cylinder 1 and the piston 2 which can be moved relative to the cylinder by means of at least one actuator.

The cylinder 1 has a tubular main part symmetric in revolution around an axis A (it can also be called "jacket").

The cylinder is extended by a flange 17 looking like a flat disk with axis A extending radially outward from the rear end 12 of the cylinder.

In the present description, the term "front" designates an element located in the direction of the outlet for the product to be delivered, therefore here towards the bottom, and the term "rear" designates an element located on the opposite side from the outlet for the product to be delivered, therefore here towards the top.

In the first embodiment, the piston 2 is securely fixed to a frame 27, on which are also fixed the bodies of the two maneuvering actuators 71, 72. As is well known, each of the actuators comprises an internal pneumatic space partitioned into two chambers 7a, 7b by a piston linked to a maneuver rod.

Each of the actuators comprises a rod 73, 74 whose end opposite the cylindrical chamber is attached to the aforementioned flange 17.

Further, in the example shown, guiding columns marked 81, 82 with a first 81a end thereof attached to the aforementioned flange 17, and a portion 81b located towards the second end, which slides in a cylindrical bearing 28 of the frame.

Further, the distribution assembly comprises an ejection head 4, which appears like a socket fixedly received inside the cylinder in the front part 11 thereof, meaning in the area of the outlet. Further the distribution assembly comprises a slide valve 3 essential for the proper operation and which will be described later, and an outlet nozzle 46 through which the product pours onto the support 9.

It needs to be remarked that the slide valve 3 is an independent and mechanically distinct part from the piston 2.

The slide valve 3 is movable between a first position P1 called closed and a second position P2 called open. We will see later that the operation gives a bistable characteristic to these two end positions, meaning that each of them is only left under a specific action. It can even be qualified by speaking of mechanical bistability, because in fact it is only a specific mechanical action which moves the slide valve from one position to the other and back.

Note that here the term "slide valve" is equivalent to other terms like "valve" or "lift valve."

In the example shown here, the slide valve 3 comprises a cylindrical body 30, a cylindrical rear rod 32 of smaller section than the section of the cylindrical body, and a front rod 31, cylindrical or not, and of smaller section than the section of the cylindrical body. Note that the slide valve can be made simply by turning. Preferably, stainless steel or else a biocompatible high performance plastic will be chosen for the material.

Inside the cylinder 1, between the piston and the ejection head, a preparation chamber 5 is defined in practice by the inner wall 15 of the cylinder 1, by the front surface 25 of the piston 2, and by the rear surface 45 of the ejection head 4.

When the slide valve 3 is in the first position P1, specifically closed (and the piston fully withdrawn), the preparation chamber has a purely cylindrical volume with axis A, diameter D1 corresponding to the inner diameter of the cylinder, and height H1 corresponding to the maximum travel for withdrawal of the piston.

When the slide valve 3 is in the first position P1, the rear rod 32 projects into the preparation chamber, but the volume reduction of the preparation chamber 5 remains limited, less than 5% and preferably less than 3%.

A transfer passage 41, connecting, selectively according to the position of the slide valve 3, the preparation chamber with the outlet nozzle 46, is provided in the ejection head 4.

In the configuration shown in FIG. 1, the preparation chamber 5 is filled with product ready to be delivered, the slide valve 3 is in closed position, meaning towards the bottom, and the outlet 41s of the transfer passage 41 is closed by the cylindrical body of the slide valve. Each transfer passage in the example shown (see FIG. 6) is formed by a hole 41a, 42a with axis parallel to the main axis A and an oblique hole 41b, 42b located respectively in the extension of the hole 41a, 42a.

To trigger the process of depositing the product, the cylinder is lowered towards the bottom until the front rod 31 of the slide valve meets the support 9. Then, the slide valve is pushed back upward and moves, because of the lowering of the cylinder 1, into the position shown in FIG. 2; at the same time, the outlet 41s of the transfer passage is freed and the product empties out by the outlet nozzle 46 into the support 9.

Figure 3:
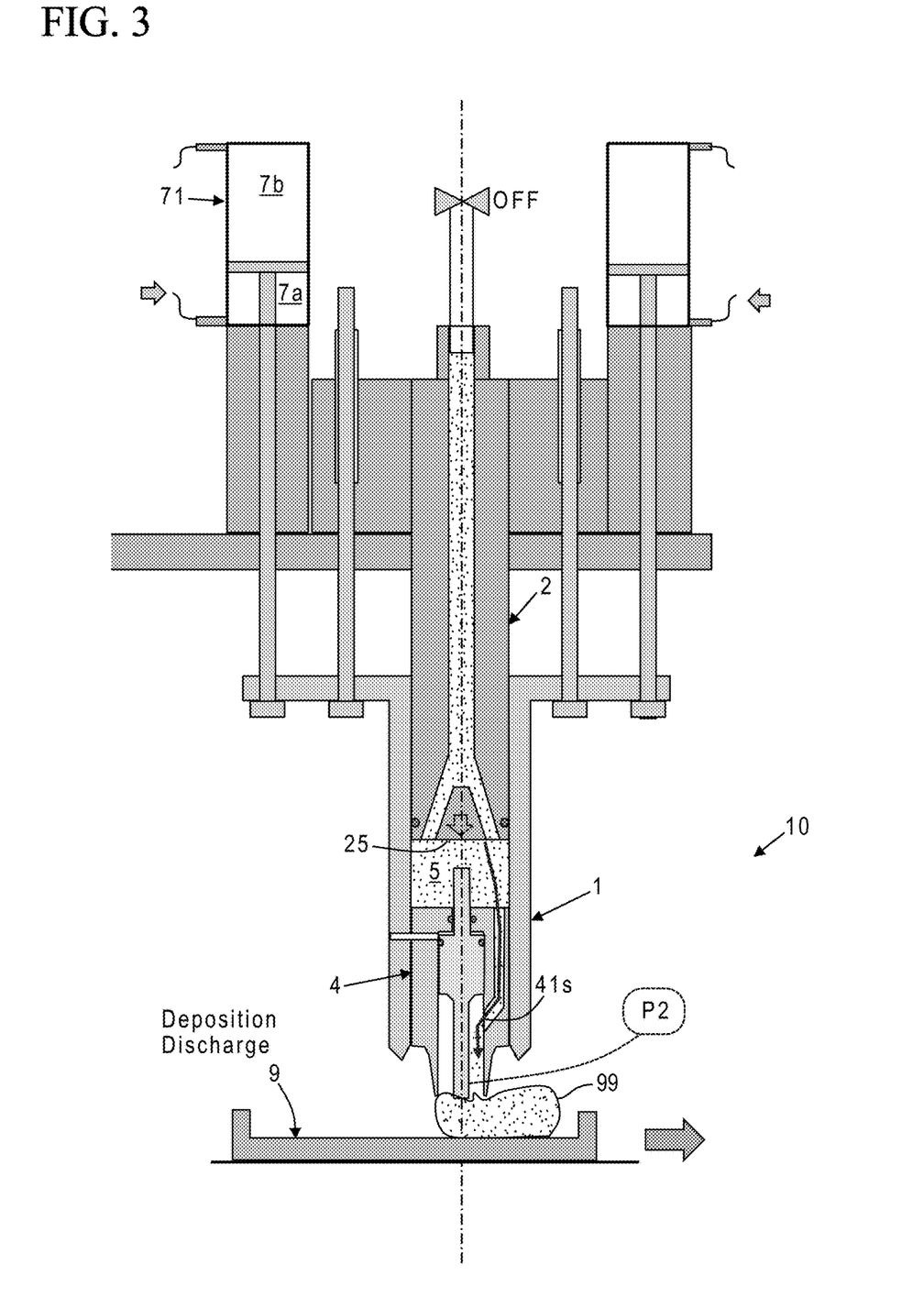
FIG. 3 is a view analogous to FIG. 1 in a configuration during delivery of the product, where the preparation chamber empties under the force of the descending piston.

Continuing, pneumatic actuators are controlled to advance the piston in the cylinder (or according to the perspective move the cylinder back relative to the stationary piston). Compressed air is sent into the inlet conduit 75 of the pneumatic actuator 71, 72. FIG. 3 shows an intermediate position, product is being deposited, a sausage of product 99 is thus formed on the support; air pressure is applied to the lower chambers 7a of the pneumatic actuators.

Figure 4:
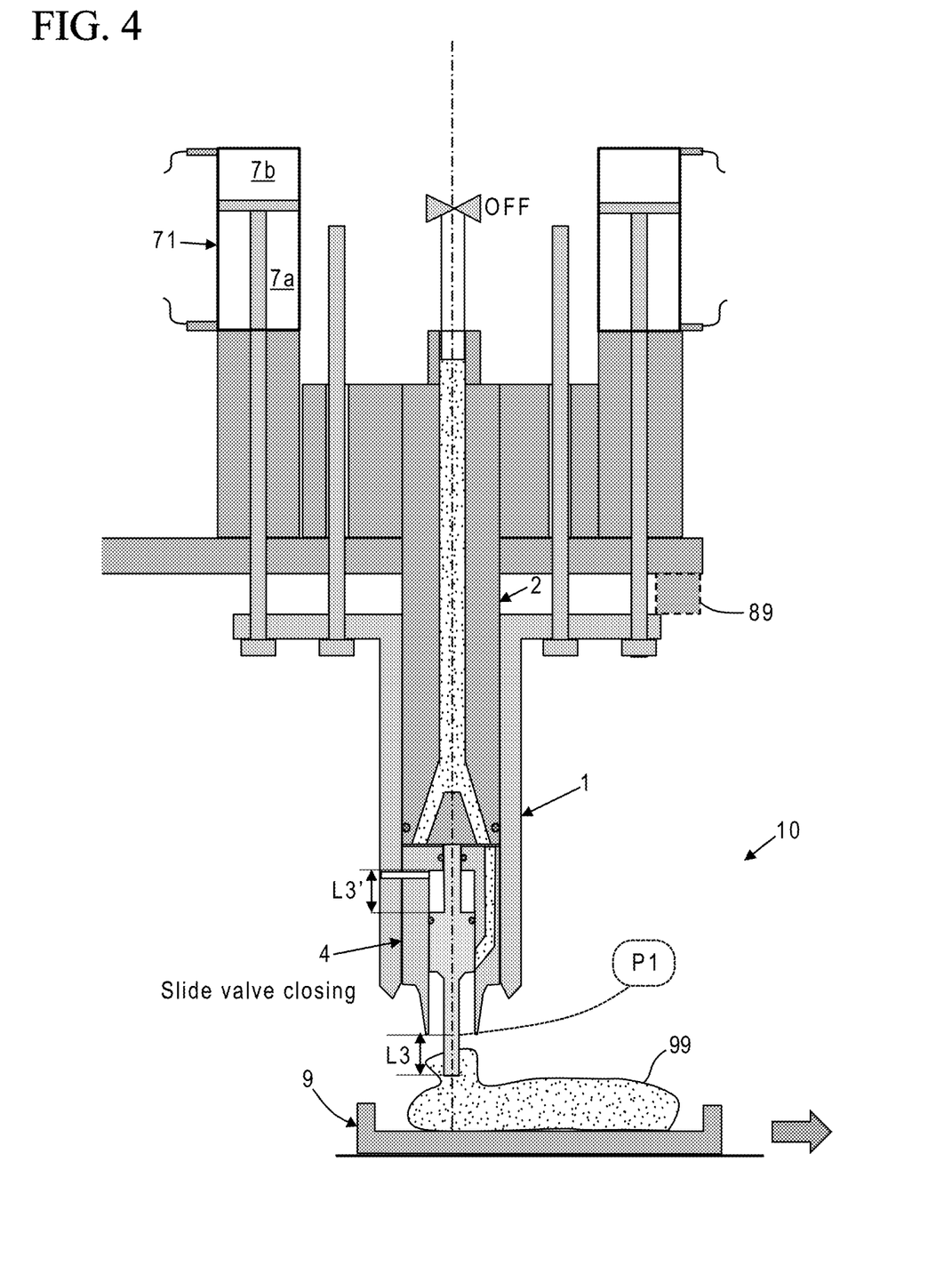
FIG. 4 is a view analogous to FIG. 1 in a configuration where the piston having arrived at the end of range pushes the slide valve which goes back to closed position ready for a new loading.
Figure 5:
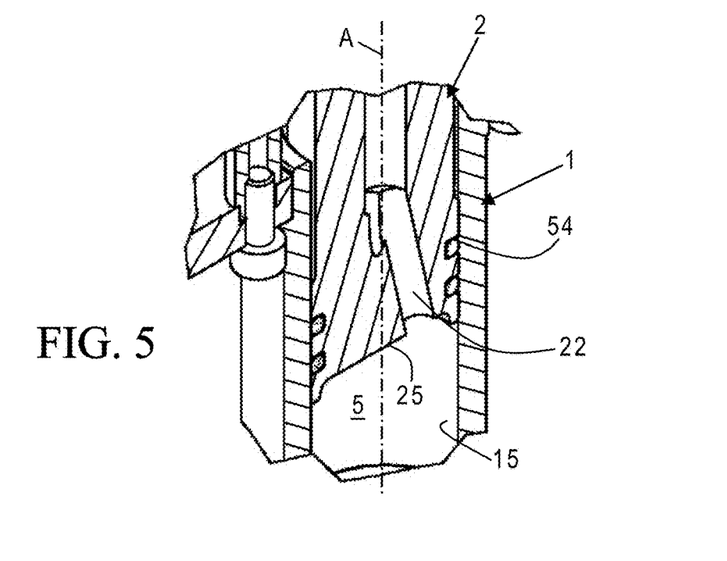
FIG. 5 is a detailed view of the front end of the piston in section and in perspective.
Figure 6:
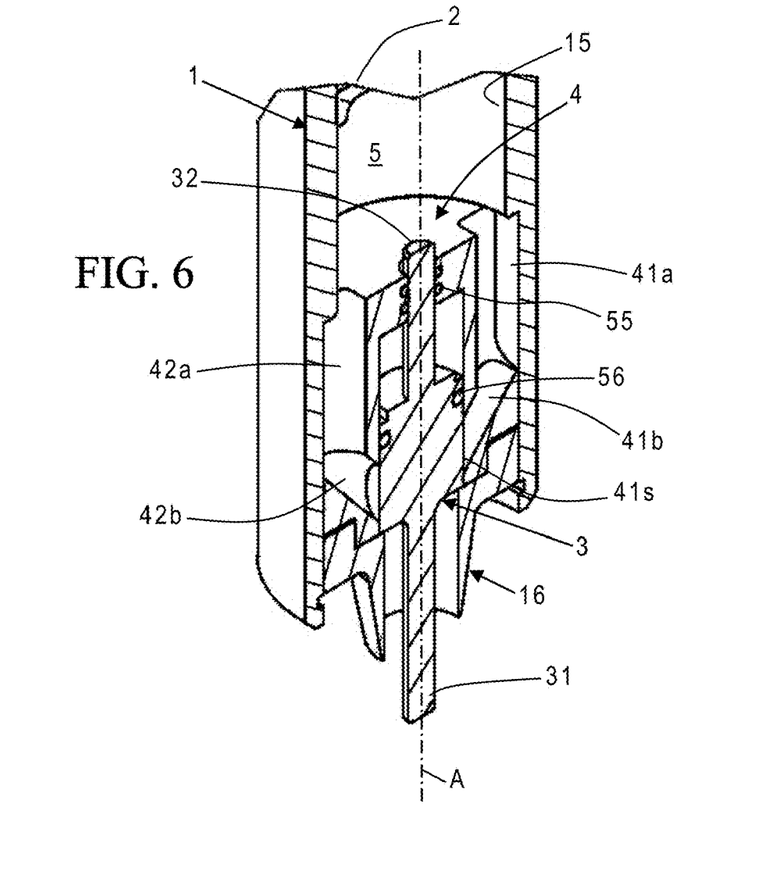
FIG. 6 is a detailed view, in section and in perspective, of the ejection head including the slide valve.

This movement continues until the piston 2 reaches the stop, meaning against the upper surface 45 of the ejection head; but, upon passage, the piston pushes the slide valve 3 back towards the bottom, which moves it from the open position P2 to the closed position P1; this is shown in FIG. 4.

An O-ring 54 is provided around the piston to provide the seal at the interface between the piston 2 and the cylinder 1.

Note that the intake of the product can be by gravity from a reserve hopper located above the distribution assembly. According to another configuration, the intake of the product comes from a pressurized reservoir.

In both cases, a solenoid type, preferably all or nothing, controlled valve 6 is provided for allowing the passage of the product from the reservoir into the preparation chamber 5. Note that the controlled valve 6 can be optional if double-effect actuators are used.

Note that when the product reservoir is pressurized, the filling can be done without active command on the pneumatic actuators because of the pressure in the reservoir; it is sufficient to change the lower fluid connections 75 to free release.

Instead, when gravity is used, it is then useful to use pneumatic actuators in double-effect mode meaning to be able to inflate each of the chambers on either side of the piston, for product loading in active "aspiration" mode.

In the example shown, the filling of the preparation chamber 5, otherwise called the "loading" operation, is done through the body of the piston 2. More precisely, the piston comprises an axial channel 20 made in the form of a central bore 20a which does not directly open out from the side of the front end of the piston, since this central bore is extended by auxiliary channels also called extensions on a bias (or "oblique") marked 22. In the example shown in FIGS. 1 to 4, there can be two extensions on a bias, but according to another example shown in FIGS. 5 to 8, there can advantageously be three extensions on a bias separated by 120° around the axis, even four extensions on a bias. This extension on a bias 22 opens out on the front end 25 of the piston in a zone intermediate in distance between the axis and the outer rim of the piston.

Figure 7:
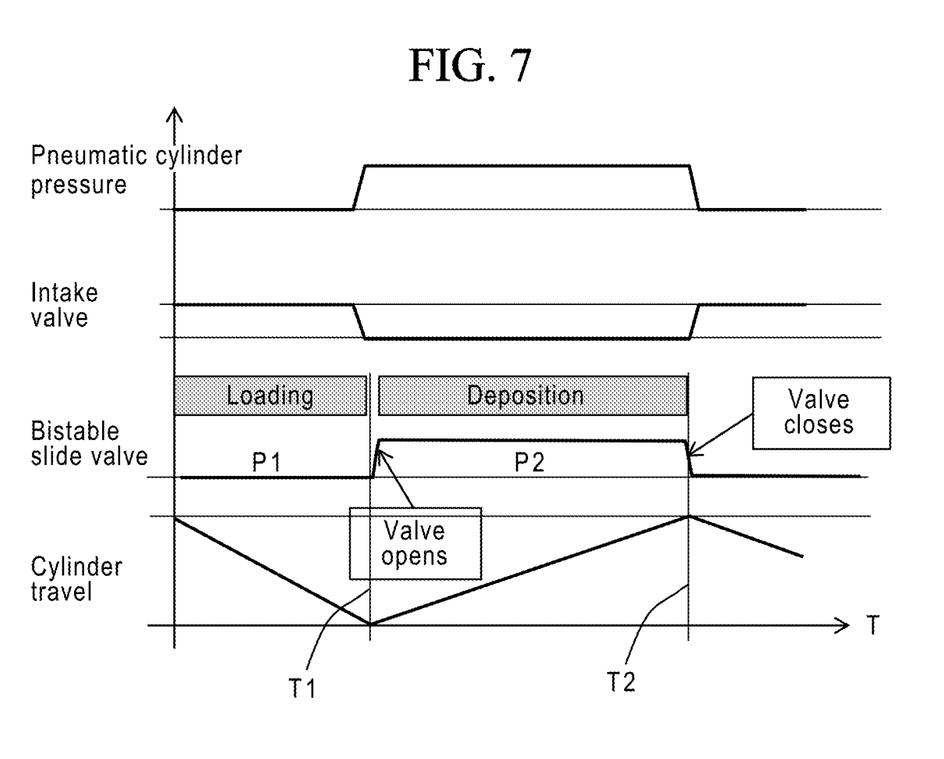
FIG. 7 shows a timeline illustrating the sequence of operations implemented by the distribution system.
Figure 8:
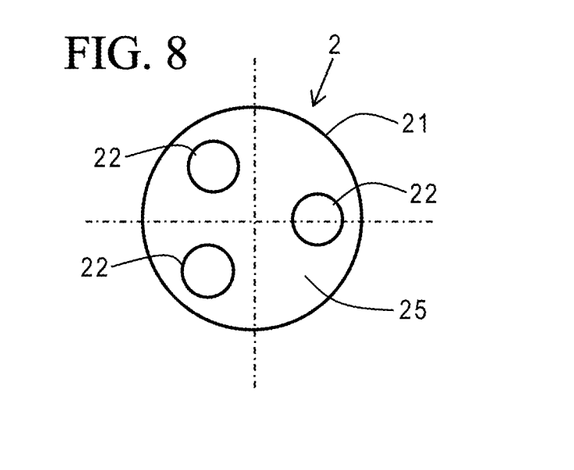
FIG. 8 shows the front part of the piston in detail.

As shown in FIG. 7, which shows the configuration where the piston is stationary with the frame, it is the jacket whose position along the axis is going to be controlled by the pneumatic means and/or by the pressure coming from the reservoir.

In the first phase shown, which is the loading, the cylinder goes down and the preparation chamber fills with product; at the moment T1, which corresponds more or less to the start of contact between the front rod of the sliding valve and the support, the closure of the intake valve 6 is ordered. The lowering ends with the withdrawal of the sliding valve 3 which causes the release of the outlet 41s and the beginning of depositing through the transfer passage 41. In the same step at time T1, the lower chamber of the pneumatic actuators is controlled so as to start the rising movement of the cylinder.

At this point it needs to be remarked that the pressure governing inside the preparation chamber is slightly greater than atmospheric pressure, but no more; this is not sufficient to push the sliding valve back towards the front, because the section of the rear rod is small and there is a frictional force from the O-rings 55, 56.

Thus starting at time T1, the cylinder is rising but the sliding valve 3 remains open which causes the continuing deposit of the product on the support, which continues until time T2.

At time T2, the cylinder approaches the maximum withdrawal and consequently the front end of the piston comes into contact with the rear rod of the sliding valve and pushes it back until the piston comes to a stop against the rear surface 45 of the ejection head 4 and simultaneously this causes the movement of the sliding valve towards the closed position P1 thereof. Then the pneumatic command on the actuator is stopped and the lower chamber moves to the free release, nearly at the same time, the intake control valve 6 is opened again which pushes the cylinder downward.

And so on until the maximum separation stop of the piston is reached and the filling ends.

The adjustment of the maximum withdrawal, i.e. the adjustment of the loading volume, is done using an adjustable stop 8, generally called "volume adjustment device 8." In the implementation shown, it involves a nut and locknut clamp 86 on the guiding columns (see FIG. 1).

When the sliding valve moves, the cylindrical body 30 passes through a space called release chamber 94. The release chamber 94 is configured to receive the cylindrical body 30 of the slide valve when it goes back up to the open position P2 thereof, and the passage 95 is provided for connecting this release chamber to open air. In that way, the movement of the slide valve is in no way hindered by the hollow space that it delimits inside the ejection head and by the air that cyclically fills it; no counter pressure is exerted on this cylindrical body 30, aside from atmospheric pressure on both sides, top and bottom.

Second Embodiment

Figure 9:
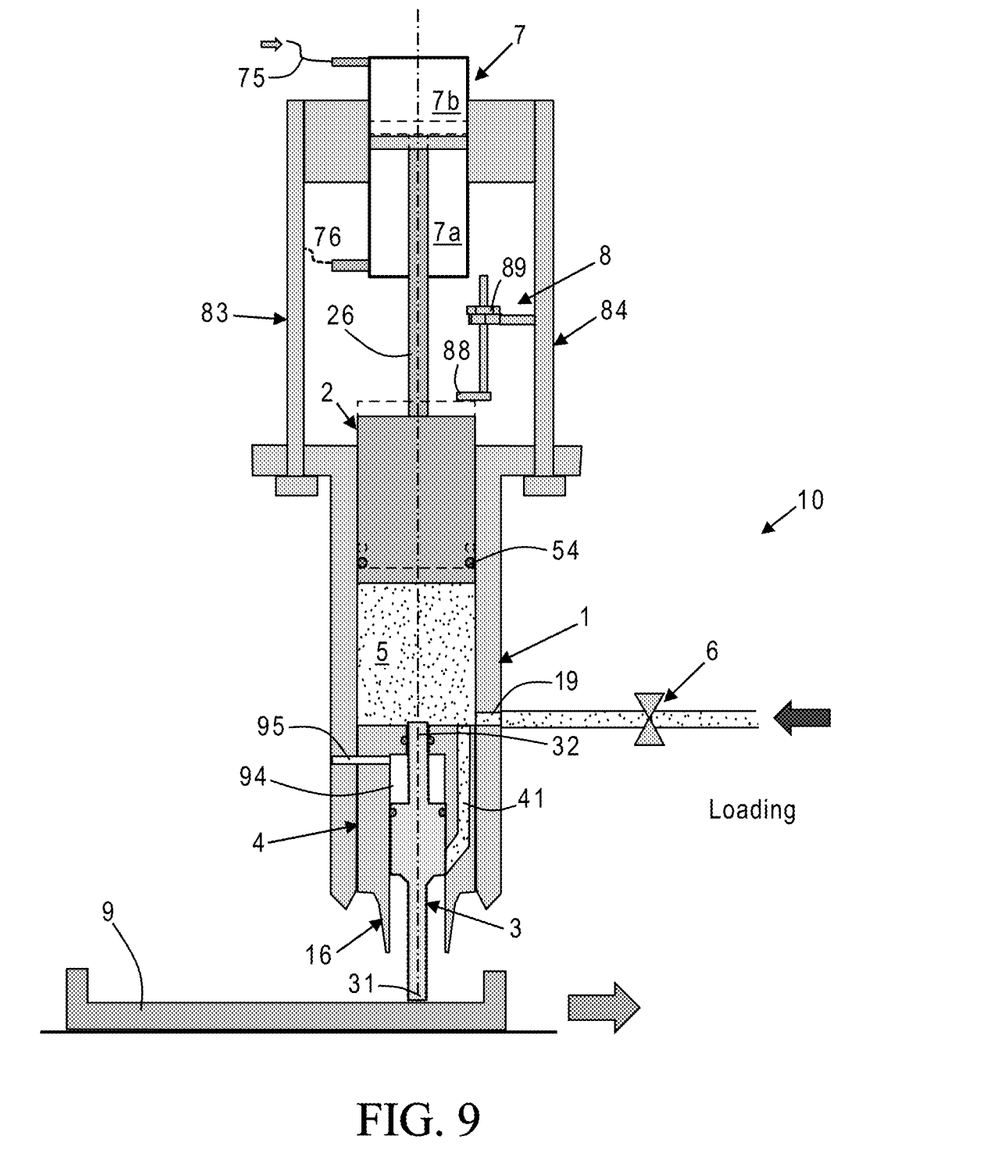
FIG. 9 is a view analogous to FIG. 1 according to a second embodiment, with a radial intake instead of axial.

As shown in FIG. 9, the intake of product from the reservoir is done in a radial position in the cylinder and not through the piston. The elements relating to the ejection head the slide valve, the transfer passage and the principle of operation of the slide valve are not repeated here because they are considered identical or similar to what was previously described.

Note that the piston can be completely basic, meaning a cylindrical piston without holes; consequently, just one pneumatic actuator 7 in axial position can be used for controlling movement of the piston inside the cylinder.

In this configuration, the body of the actuator 7 is connected to the cylinder (and not to the piston) and consequently the inlet to be controlled 75 (for controlling the deposit of the product) is located on top (configuration inverted compared to the first example). The body of the pneumatic piston is connected to the flange of the cylinder by the columns marked 83, 84.

The position of the filling orifice 19 is located in the wall of the cylinder in the position immediately adjacent to the rear surface 45 of the ejection head. Note that there can be several small filling orifices on the perimeter of the cylinder supplied by a collector, not shown.

For adjustment of the maximum range of separation the piston, a volume adjustment device, marked 8, is provided as in the first embodiment; here it has the form of a clamp 88 adjustable in height by, for example, a nut 89 to be tightened or screw-nut mechanism. The clamp 88 forms a stop for the farthest rising of the piston in the cylinder which consequently defines a maximum intake volume for the preparation chamber 5.

Note that in the first position, the front rod 31 of the slide valve goes past a certain length L3; in practice this length also corresponds to the axial length L3' of the discharge chamber. However note that L3' could be slightly greater than L3.

It needs to be remarked that the slide valve 3 according to the present invention is moved by direct mechanical means, and not by a simple pressure differential. Consequently, whatever the consistency of the product it operates correctly even though the proper operation of a vacuum relief valve would be altered by a very viscous liquid or in case of small lumps.

Figure 10:
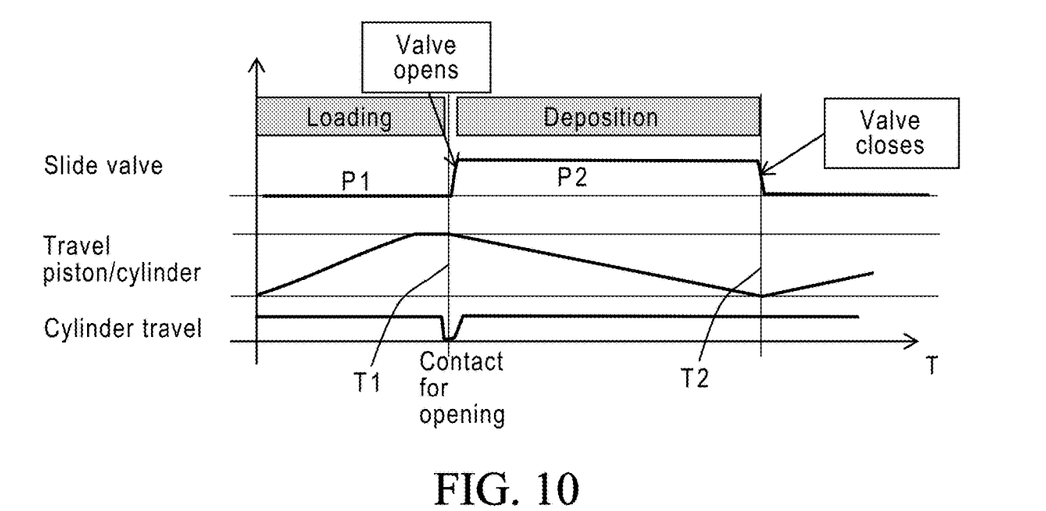
FIG. 10 is a chart analogous to that from FIG. 7, according to an implementation variant.

A chronological sequence is shown in FIG. 10 in a configuration where the cylinder is guided into position (for example on a crane or robotic arm) and where the movements of the piston are driven by the pneumatic actuator 7.

In the first phase shown, meaning the loading, the piston rises and the preparation chamber 5 fills with product; about the time T1, the lowering of the assembly [cylinder+piston] is ordered until the front rod 31 of the slide valve contacts the support 9 and the slide valve 3 withdraws which causes the movement thereof from closed position P1 to the open position P2 and the flow of the product through the transfer passage 41. Simultaneously or right after, the deposit sequence starts, under the effect of the pneumatic filling of the upper chamber 7b of the pneumatic piston 7. The depositing sequence continues until the moment T2 when the piston ends the descent thereof and comes to a stop while simultaneously pushing back the slide valve 3 from the open position P2 thereof to the closed position P1 thereof.

Just as before, the pressure governing inside the preparation chamber during the deposit phase is slightly greater than atmospheric pressure, but no more; this is not sufficient to push the sliding valve back towards the front, because the section of the rear rod is small and there is a frictional force from the O-rings 55, 56. Thus starting at time T1, the cylinder is rising but the sliding valve 3 remains open which causes the continuing deposit of the product on the support, which continues until time T2.

A loading phase time slightly shorter than the deposit phase time is shown in FIGS. 7 and 10. However, according to an advantageous variant the loading can be much faster than the deposit phase if the reservoir is pressurized. Thus, a loading phase of order was 0.1 seconds can be obtained for a deposit phase time included between 0.4 second and 1 second.

In general, a ratio between the loading time and the deposit time included between ½ and ⅛ is preferred. Typically the full cycle time (loading+depositing) could be included between 0.4 seconds and 2 seconds.

As for the volume taken into the preparation chamber, there aren't really any limits; typical applications can handle volume between 1 cm³ and 100 cm³.

The cylinder 1 can be made of stainless steel, or of synthetic material or high performance plastic compatible with food. It is the same for the ejection head 4 which can be made of the same materials.

As for the piston 2, it can also be made of stainless steel; Teflon or high performance synthetic material can also be suitable.

As for typical dimensions, a dimension included between 25 and 40 mm can be chosen for D1, with D2 typically equal to D1+3 mm to 6 mm depending on the thickness of the cylinder wall.

The invention claimed is:

1. A distribution assembly for a product in liquid or dough or foam form, for delivering and depositing a precise quantity of the product on a support, where the distribution assembly comprises:
    a cylinder, having an axis A;
    a piston, which is displaceable in the cylinder by at least one actuator;
    an intake path for taking in the product;
    an ejection head, which comprises a slide valve movable between a closed first position (P1) and an open second position (P2), and an outlet nozzle;
    a preparation chamber arranged in the cylinder between the piston and the ejection head; and
    at least one transfer passage, connecting, selectively according to the position of the slide valve, the preparation chamber with the outlet nozzle,
    where the distribution assembly is arranged such that when the cylinder comes towards the support, a physical contact with the support moves the slide valve from the closed first position to the open second position and triggers a delivery of the product, pushed by the piston, via the transfer passage,
    and when the piston arrives at a forward end of range, the piston moves the slide valve from the open second position to the closed first position and thus closes a flow of the product via the transfer passage,
    and where the first and second positions are stable.

2. The distribution assembly according to claim 1, wherein the product enters the preparation chamber from a reservoir via a controlled valve, disposed on the intake path, either by means of gravity or by means of a pressurization of the reservoir.

3. The distribution assembly according to claim 1, wherein the piston comprises an axial intake channel for taking in the product.

4. The distribution assembly according to claim 3, wherein the axial intake channel comprises a central bore and at least one extension on a bias.

5. The distribution assembly according to claim 1, wherein the intake path is radial, through an orifice laid out in the cylinder in the neighborhood of the ejection head.

6. The distribution assembly according to claim 1, wherein the slide valve comprises a cylindrical body, a front rod of smaller section than that of the cylindrical body, and a rear rod that is cylindrical and of smaller section than that of the cylindrical body.

7. The distribution assembly according to claim 1, wherein the piston is mounted on a frame with the actuator, and the cylinder and the ejection head are movable relative to the piston and the frame.

8. The distribution assembly according to claim 1, further comprising a device for adjustment of an intake volume, configured to control a maximum separation between the piston and the ejection head for delimiting the intake volume taken into the preparation chamber.

9. The distribution assembly according to claim 1, wherein a release chamber is provided, configured to receive a cylindrical body of the slide valve when the slide valve moves to the open second position, and a purge passage for connecting the release chamber to open air.

10. The distributions assembly according to claim 1, wherein the product is a food product.

* * * * *